April 26, 1960  F. MILLET  2,933,845
MECHANICAL DEVICE FOR CASTING BAIT AND SIMILAR PURPOSES
Filed July 15, 1957  2 Sheets-Sheet 1
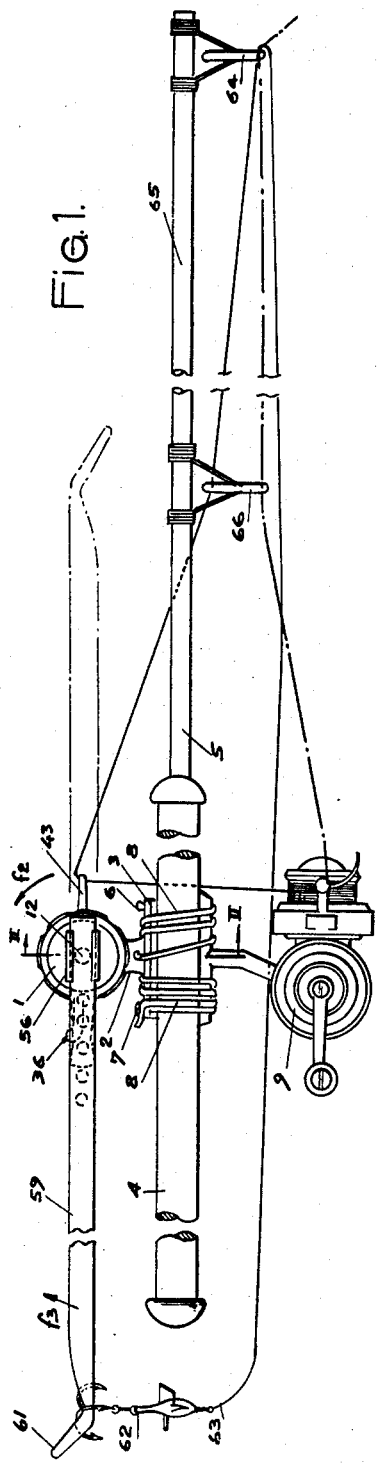
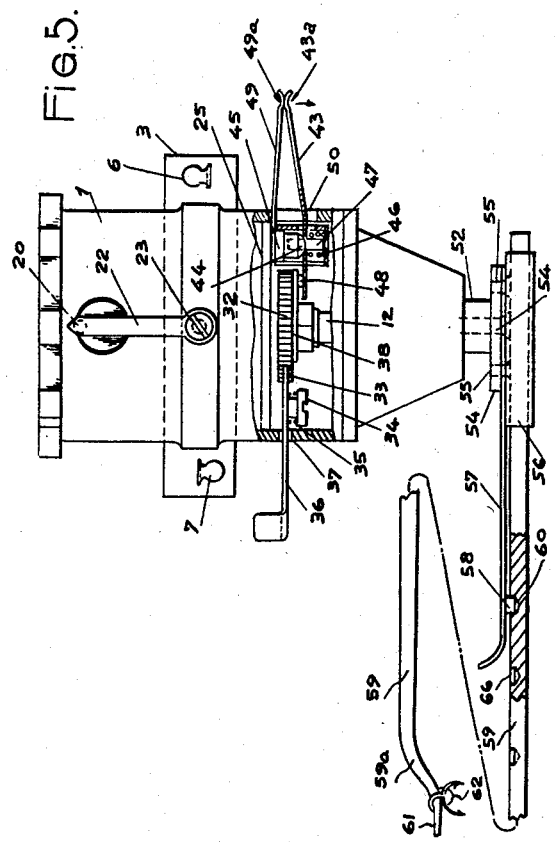
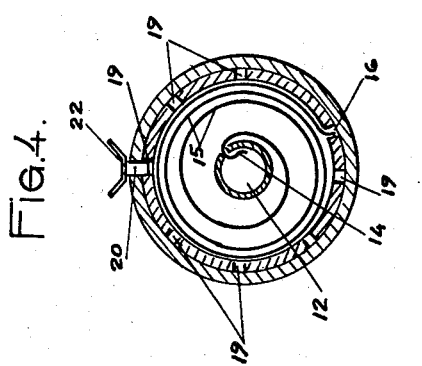
INVENTOR:
FRANÇOIS MILLET
BY MAXWELL E. SPARROW
ATTORNEY April 26, 1960 F. MILLET 2,933,845
MECHANICAL DEVICE FOR CASTING BAIT AND SIMILAR PURPOSES
Filed July 15, 1957 2 Sheets-Sheet 2
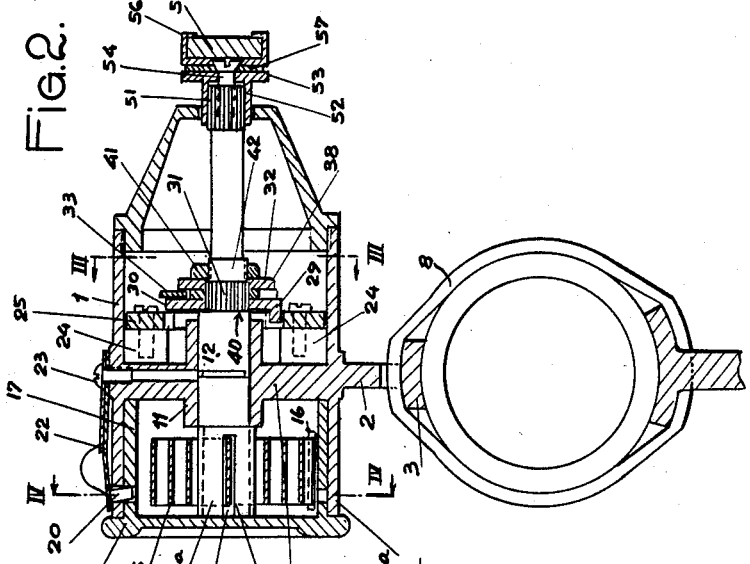
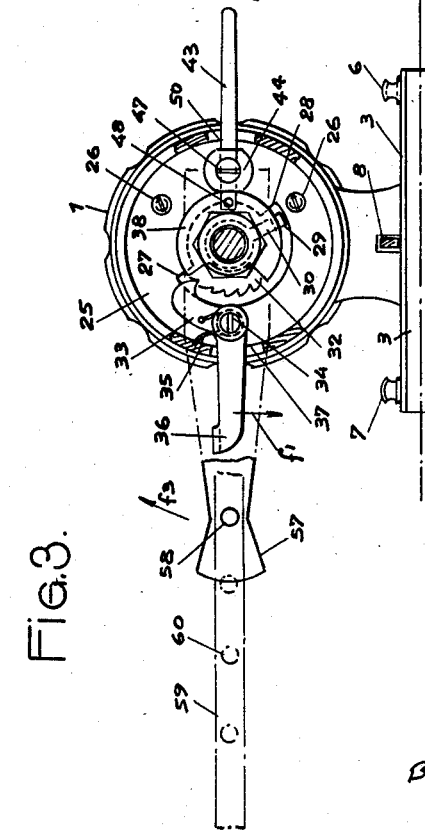
INVENTOR:
FRANCOIS MILLET
By MAXWELL E. SPARROW
ATTORNEY

United States Patent Office 2,933,845
Patented Apr. 26, 1960

2,933,845

MECHANICAL DEVICE FOR CASTING BAIT AND SIMILAR PURPOSES

François Millet, Montigny-les-Cormeilles, France

Application July 15, 1957, Serial No. 671,954

3 Claims. (Cl. 43—19)

The practice of casting-fishing and more particularly casting-fishing in rivers requires special training and very great skill, especially when the river is bordered by bushes or trees and it frequently occurs that it is impossible suitably to make a cast, even for a skilled fisherman, when access to the bank is too narrow to allow the rod to be swung for casting the bait.

Furthermore, the movement imparted to the rod when casting often has the effect of casting a moving shadow on the river which scares the fish. This is often the case when the fisherman is placed between the river and the sun.

The present invention creates a new device which allows bait to be cast, even to great distances, without it being necessary to impart any movement to the rod, thus preventing its shadow from being cast on the water, and moreover, the device of the invention makes it possible to carry out casting in extremely confined spaces in which, up till now, it would have been materially impossible to cast in any kind of manner.

According to the invention, the mechanical device for casting bait and similar purposes, is characterised in that the device comprises a casing with an inside shaft subjected to resilient casting elements operated by a hand-controlled ratchet mechanism, this shaft carrying, outside the casing, a small casting-rod placed parallel to the longitudinal axis of the fishing-rod, the end of this small rod forming a hook for attaching the bait for casting, when the resilient members are released.

Various other characteristics of the invention will moreover be revealed by the detailed description which follows.

One form of embodiment of the invention is shown, by way of non-restrictive example, in the attached drawing.

Fig. 1 is a longitudinal elevation-section of a fishing rod provided with the device according to the invention.

Fig. 2 is a larger scale elevation-section, seen along the line II—II of Fig. 1.

Fig. 3 is a section taken along the line III—III of Fig. 2.

Fig. 4 is a section, seen along the line IV—IV of Fig. 2.

Fig. 5 is a partially cut-away plane view corresponding to Fig. 2.

The device shown in the drawing comprises a casing 1 which may be cylindrical. This casing is mounted on a leg 2 forming a base 3 at its lower part, whose underneath is grooved, so that it can be partially enclosed in the handle 4 of a fishing rod 5.

The top of the base 3 carries two hooks 6, 7, formed like shoe hooks which act to hold the ends of a strap or thong 8 used for fixing the device, this thong being wound on to the base and handle.

It is advantageous, in order that fixing is properly made, that the strap or thong 8 should be made of rubber or other flexible material.

As shown in Fig. 1, this thong 8 also acts for fixing the reel 9 with which the casting-rod 5 is provided.

At its middle part, the casing 1 carries a partition 10 which forms a sleeve 11 in which a shaft 12 can revolve. This shaft has a slot 13 near to its end 12a in which the end of a spring 15 is engaged, whose other end is engaged in a port 16 of a socket 17 formed by a cap 18 which closes the end 1a of the casing 1.

As will be seen more particularly in Fig. 4, the socket 17 has holes 19 round its periphery. One of these holes acts for engaging a finger 20 carried by a resilient blade 22 fixed to the top of the casing 1 by a screw 23.

As can be seen from the foregoing, it is possible to impart to the spring 15, which is spiral shaped, a more or less greater constraint by turning the socket 17 round in the direction whereby the spring is progressively tightened, this socket being then locked in the position selected by the finger 20, engaged in one of the holes 19.

The partition 10 forms bosses 24 on which a crown 25 is fixed by a screw 26. This crown is pierced at its middle part and delimits two abutments 27 and 28. These abutments are intended to co-operate with a finger 29 which forms a part 30 internally grooved and threaded on to flutings 31 on the shaft 12. These flutings 31 also act for chocking a ratchet wheel 32, with whose sloping teeth a pawl 33 co-operates, which is hinged on a spindle 34 formed, for example, by a screw screwed into a tapped part of the crown 25.

35 indicates a spring for holding the pawl 33 in mesh with the teeth of the ratchet wheel 32.

The pawl 33 can be released by acting, in the direction of the arrow $f_1$, on a lever 36 with which it is integral, this lever projecting outside the casing 1 as shown in Fig. 3, passing through an opening 37 in the latter.

The fluted part 31 of the shaft 12 also carries an open ring 38 forming a cam. This cam, the ratchet wheel 32 and the part 30 are kept in place against a shoulder 40 of the shaft 12 by a nut 41 screwed on to a threaded part 42 of this shaft.

The cam forming the open ring 38 is intended to control the movement of a pivoting lever 43, firmly held on a rounded boss 44 of a button 45 by a spring 46 which is compressed by a screw 47, screwed into the button 45 and the crown 25, as shown in Fig. 5.

The pivoting lever 43, which is formed by a resilient blade, is curved at its end 43a for bearing—when a finger 48 that it carries rests on the cam 38—on the corresponding curved part 49a of a second resilient blade 49 which is held by the button 45.

As can more particularly be seen in Figs. 3 and 5, the resilient blades 49 and 43 traverse the casing 1 through an opening 50 in the latter.

At its free end, the shaft 12 comprises a fluted part 51 (Fig. 2) on to which a fluted socket 52 is threaded, integral with a plate 53, which is moreover connected to the shaft 12 by a screw 54.

The plate 53 is connected by a screw 54 and screws 55 (Fig. 5) to a slide 56 and a resilient blade 57 carrying a nipple 58.

The slide 56 acts for holding a small rod 59, which may be flexible or rigid and made of various materials such as wood, synthetic material or possibly metal. This small rod comprises, as shown in Fig. 5, blind holes 60 for inserting the nipple 58 of the resilient blade 57, and which enables, by more or less engaging this small rod in the slide 56, to vary the effective length of the small rod, at will.

The end 59a of the small rod 59 is curved, so that this end 59a which forms a hook 61 (Figs. 1 and 5) is offset in relation to its longitudinal axis.

As can also be seen from Figs. 1 and 5, the hook 61, formed by the small rod, is used for attaching a bait 62 which is placed outside the downward part formed by the end 59a and which is held by one of the bait hooks.

63 indicates a line fixed to the bait 62.

As can be seen from Fig. 1, this line passes through the terminal ring 64 of the top piece 65 of the fishing-rod 5, then into the other guiding rings 66 and finally this line is gripped between the two resilient blades 49 and 43 on leaving the reel 9.

The apparatus described above works as follows:

The small casting-rod 59 is first of all properly placed in the slide 56, then this tongue-piece is turned in the direction of the arrow $f_2$ (Fig. 1); this movement has the effect of turning the shaft 12 in the same direction and stretching the spring 15.

When the small rod 59 is brought to the position shown in Fig. 1, the finger 29 of the part 30 keyed on to the shaft 12, comes into contact with the abutment 28, formed by the crown 25, which has the effect of limiting the pivoting movement that the small rod 59 can assume, which must normally be maintained in a manner appreciably parallel to the handle 4 of the fishing-rod 5.

In this position, the finger 48 of the resilient pivoting lever 43 presses against the open ring 38 forming a cam. Also in this position, the end 43a of the lever 43 is tightened against the corresponding end of the flexible blade 49, which enables the line 63 to be gripped on leaving the reel 9, as shown in Fig. 1.

The bait 62 being attached as explained above, the pick-up of the reel is released, and the fishing-rod used for sighting the approximate spot where the bait is to be dropped, then the lever 36 is pressed in the direction of the arrow $f_1$ for releasing the pawl 33.

The ratchet wheel 32 being no longer held, the spring 15 can release itself, which has the effect of pivoting the shaft 12 in the direction of the arrow $f_3$.

This movement of the shaft 12 is obviously transmitted to the small rod 59 which conveys the bait 62 up to the moment when the finger 29 of the part 30 engages the abutment 27 formed by the crown 25.

The shaft 12 and the small rod 59 being abruptly stopped, the bait 62, to which a certain amount of kinetic energy has been imparted continues the trajectory along which it has been cast like a stone from a catapult.

During the pivoting movement of the shaft 12 in the casting direction, the open ring 38 forming a cam turns by a corresponding amount, and consequently, the finger 48 of the flexible lever 43 is released at a certain moment from this cam and presses against the side of the ratchet wheel 32. Owing to this, this lever 43 pivots slightly and its end 43a deviates from the end 49a of the flexible blade 49, thus releasing the line 63 which was originally gripped. This releasing of the line, timed with the casting of the bait, has the same effect as when the fisherman releases the line when casting, as occurs in the usual hand-casting technique by swinging the fishing-rod 5 around.

As the end 59a of the small rod 59 is curved, the line 63 runs no risk of winding itself on to this small rod nor catching on the fishing-rod, for, as can be seen from Fig. 5, the small rod 59 is moreover appreciably offset in relation to the axis of this fishing-rod.

The invention is not restricted to the form of embodiment shown and described in detail, for various modifications can be applied to it, without going outside of its scope.

I claim:

1. A casting unit for a fishing rod comprising a casing provided with a base member for removable connection with said fishing rod, a pivoting shaft in said casing extending transversely with respect to said fishing rod, a casting rod removably connected at one end of said shaft outside said casing, an adjustable spring connected to said shaft and to said casing so as to enable said casting rod to be pivoted from an extreme forward position to an extreme rearward position, a hand-operated mechanism to control the pivoting movement of said shaft, said mechanism comprising a ratchet wheel rigidly attached to said shaft and a pawl which is adapted to engage and disengage said ratchet wheel, and means to limit the pivoting of said shaft at the two extreme positions it is able to occupy.

2. A casting unit for a fishing rod having a reel for the fishing line thereof comprising a casing provided with a base member for removable connection with said fishing rod, a pivoting shaft rotatably mounted in said casing and extending transversely with respect to said fishing rod, a casting rod removably connected at one end of said shaft outside said casing, a spring connecting said shaft to said casing to pivot said casting rod, a rotatable cover with locking means fitted on said casing and adapted for adjustment of said spring, hand-operated means for the locking of said shaft and the releasing thereof, means to limit the stroke of said shaft in either one of two directions, and a gripping member controlled by said hand-operated means to grip said fishing line and releasing it in time relation with the actuation of said hand-operated means.

3. A casting unit for a fishing rod having a reel for the fishing line thereof comprising a casing provided with a base member for removable connection with said fishing rod, a pivoting shaft rotatably mounted in said casing and extending transversely with respect to said fishing rod, said shaft having one end extending outside said casing, a socket provided with a transverse slide rigidly connected to said outside extending end of said shaft, a casting rod slidably engaged in said slide, locking members carried by said slide to lock said casting rod in different positions, a spring connecting said shaft to said casing to pivot said casting rod located inside said casing, a rotatable cover with locking means fitted in said casing and adapted for adjustment of said spring, a hand-operated means for the locking of said shaft and the releasing thereof, means to limit the stroke of said shaft in either one of two directions, and a gripping member controlled by said hand-operated means to grip said fishing line and releasing it in time relation with the actuation of said hand-operated means.

References Cited in the file of this patent

UNITED STATES PATENTS

| | | |
|---|---|---|
| 1,140,608 | Phillips | May 25, 1915 |
| 1,226,162 | Attula | May 15, 1917 |
| 2,765,568 | Kozar | Oct. 9, 1956 |